United States Patent [19]

Biegenzein

[11] 4,314,921

[45] Feb. 9, 1982

[54] METHOD AND APPARATUS FOR PREPARING A BITUMINOUS BINDER

[75] Inventor: Günter Biegenzein, Viena, Austria

[73] Assignee: Novophalt SA, Luxembourg

[21] Appl. No.: 111,946

[22] Filed: Jan. 14, 1980

[51] Int. Cl.$^3$ .............................................. C08L 91/00
[52] U.S. Cl. ................................ 260/28.5 AS; 366/22
[58] Field of Search .................................. 260/28.5 AS

[56] References Cited

U.S. PATENT DOCUMENTS

| | | | |
|---|---|---|---|
| 3,317,447 | 5/1967 | Black et al. ................. | 260/28.5 AS |
| 3,853,800 | 12/1974 | Haberl ......................... | 260/28.5 AS |
| 4,240,946 | 12/1980 | Hemersam ................... | 260/28.5 AS |

FOREIGN PATENT DOCUMENTS

| | | |
|---|---|---|
| 321185 | 3/1975 | Austria. |
| 1185372 | 9/1965 | Fed. Rep. of Germany. |

OTHER PUBLICATIONS

Cement, Concrete, vol. 81/1974.
Bitumen und Asphalt Taschenbuch, Third Edition, 1964, pp. 100 and 101.

*Primary Examiner*—Melvyn I. Marquis
*Attorney, Agent, or Firm*—Kurt Kelman

[57] ABSTRACT

A bituminous binder for asphalt road coverings is prepared by homogenizing a blend of bitumen and polyethylene and/or polypropylene in a heated mixing vessel while stirring the blend and melting and dissolving the polyolefin in the bitumen. The blend is heated to a temperature between 260° C. and 310° C. and subjected to forceful mixing under a high shearing force. The homogenization is continued until the polyolefin has been degraded and the viscosity of the homogenized blend has been reduced below the viscosity reduction attendant upon the mere heating of the blend at this temperature.

25 Claims, 3 Drawing Figures

METHOD AND APPARATUS FOR PREPARING A BITUMINOUS BINDER

The present invention relates to the preparation of a bituminous binder for construction materials containing dispersed solid, predominantly inorganic additive substances, such as gravel and sand, particularly asphalt road paving materials, and more particularly to a method which comprises homogenizing a blend of bitumen and at least one polyolefin selected from the group consisting of polethylene and polypropylene in a heated mixing vessel while stirring the blend and melting and dissolving the polyolefin the bitumen, the blend being heated to a temperature between 260° C. and 310° C., and continuing the homogenization until the polyolefin has been degraded and the viscosity of the homogenized blend has been reduced below a viscosity reduction attendant upon the mere heating of the blend at this temperature. The blend preferably contains more than 10%, by weight, of the polyolfein, based on the weight of the bitumen, and the temperature may range between 280° C. and 300° C.

As is known, blending a polyolefin with bitumen considerably improves the properties of a bituminous binder for construction materials, particularly pavement materials. More particularly, the polyolefin addition will increase the cohesion of the materials, which is decisive for their load-carrying capacity, as well as the useful life of the materials and their resistance to damaging weather conditions without disadvantageously embrittling the construction materials at low temperatures. The stiffness imparted to the binder by the admixture of polyolefin is reduced by the above-described homogenization to such an extent that the resultant asphalt pavement materials can be applied to the road by conventional asphalt roller application techniques.

It has been found that the homogenization process for preparing such a bituminous binder with substantially novel properties requires frequently a very long time until the viscosity of the blend has been reduced to the indicated degree so that the productivity of a mixing vessel of a given size is rather low. In this respect, it must be noted that the homogenization depends not only on time and temperature but also on the mixing intensity and the composition of the blend, which is determined not only by the type of bitumen and polyolefin used but also particularly by the weight ratio of bitumen: polyolefin.

It is the primary object of this invention to shorten the preparation time in the described method while producing a high-quality bituminous binder and assuring that no damage is done by the homogenization to the usefulness of the binder components.

This and other objects are accomplished according to the invention by subjecting the blend to forceful mixing under a high shearing force during the homogenization.

This operating condition accomplishes the above object well and a high-quality bituminous binder is thereby obtained at relatively low expense and the productivity of the manufacturing facilities is greatly enhanced. Despite the different properties of the bitumen and polyolefin components of the blend, this method forms a homogenous substance in a short time because the forceful mixing under a high shearing force produces a substantial equalization of the shearing force relations in the structurally viscous, non-polar polyolefin, on the one hand, and the polar amorphous bitumen, on the other hand. In conjunction with the high temperature at which the homogenization proceeds, this produces a rapid flow and solution of the two components of the blend and a resultant intermingling with each other. At the same time, the thermal degradation of the polyolefin favors bonds with the naphthene components of the bitumen. The thermal degradation of the polyolefin further reduces differences between the molecules of the polyolefin, which is of particular importance if the polyolefin is used in the form of waste material, which is economically and ecologically advantageous.

Homogenization may be effected in a heated mixing vessel which incorporates means for forcefully mixing the blend under a high shearing force to obtain a compact apparatus.

The present invention also provides, however, a preferred apparatus for preparing the bituminous binder, which comprises a mixing vessel for homogenizing the blend, means for stirring the blend in the vessel, a recycling conduit having respective ends connected to the vessel for removing the stirred blend from the vessel and returning the removed blend to the vessel, and means in the recycling conduit for subjecting the removed blend to forceful mixing under a high shearing force before it is returned to the vessel. Such an apparatus has a very high production efficiency.

In the accompanying generally schematic drawing.

Figure 1:
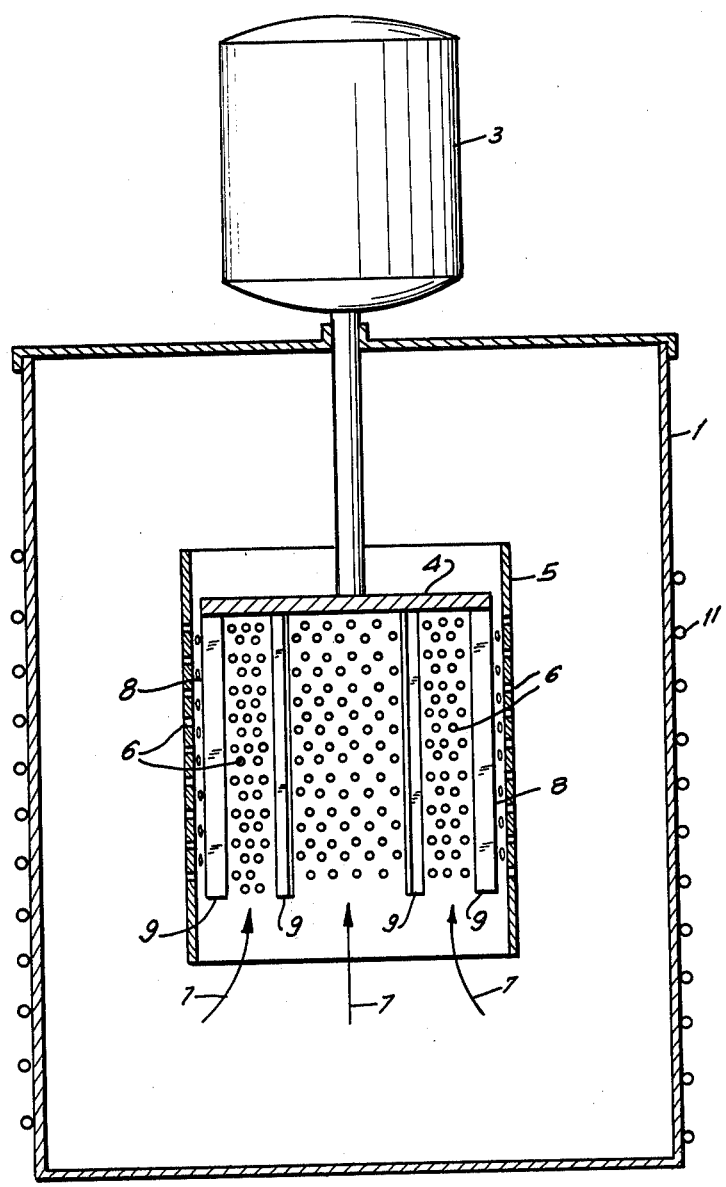
FIG. 1 is a side elevational view, partly in axial section, showing one embodiment of a mixing vessel useful in the method of this invention.

Usefully, the forceful mixing of the blend under a high shearing force may be effected in the recycling conduit by a pump which forces the blend through the conduit and, at the same time, exerts a high shearing force on the bitumen-polyolefin mass, such as a screw pump including a housing and a rotary screw surrounded by the housing. If desired, a like effect may be obtained by arranging a kneading device in the recycling conduit. Furthermore, it is advantageous to arrange a heat exchanger in the recycling conduit to heat the blend passing therethrough, which facilitates and expedites the homogenization.

An impact mixer installed either in the mixing vessel or in the recycling conduit is a particularly effective mixing means and produces in a short time a homogenous bituminous binder of particularly high adhesion to the gravel and sand of the construction material. While I am not bound by any theory, this may be explained by the fact that an impact mixer produces a colloidal comminution so that the polyolefin comes into close contact with the pores of the gravel and sand, thus increasing the bonding property of the binder while, on the other hand, the bitumen component will not be substantially embrittled at low temperatures when blended with polyolefin under these working conditions.

The adhesion of the binder to the inorganic additive substances will generally be enhanced further if the binder contains metal salts of organic acids, particularly higher fatty acids, for example palmitates or stereates, thus also producing chemical bonding.

Intensely working the bitumen-polyolefin mass with an impact mixer further produces considerable heating of the mass so that the required temperature range for the homogenization may be rapidly reached with little or even without outside heating.

The time for homogenization will be shortened and a binder of particularly high quality will be produced with a forceful mixing means developing a shear stress of at least 20 meters/second. Preferably, the blend is forced through a narrow passage between a rotary mixing element and a stationary element adjacent thereto, the circumferential rotary speed of the rotary element relative to the stationary element along the edges of the rotary element being at least 20 m/s.

It will be advantageous to effect the homogenization in the substantial absence of air to avoid unfavorable atmospheric influences on the process, such as oxidation in the temperature range of 300° C. Operating in the absence of air can be easily achieved when homogenization is effected in the recycling conduit since the level of the heated blend in the mixing vessel may be held above the two ends of the recycling conduit connected to the vessel and the vessel itself may be closed. In this manner, practically no air will enter into the recycling conduit and substantially no oxidation of the mass will occur. Therefore, the operating temperature may be held quite high without reducing the quality of the resultant binder.

The speed and degree of homogenization of the blend will be further enhanced if the polyolefin component thereof contains, atactic polypropylene in addition to polyethylene and/or isotactic (crystalline) polypropylene. Atactic polypropylene has an amorphous structure and its addition to the blend produces not only an easier and faster homogenization but also stabilizes the resultant binder over an extended period of time. This is particularly true when the binder is used in a paving or other construction material used at temperatures below 0° C. It atactic polypropylene is used, the blend preferably contains 10% to 25%, by weight, of the atactic polypropylene, based on the weight of the polyolefin in the blend. An excellent binder has been produced with an olefin component comprised of above five parts, by weight, of polyethylene and about one part, by weight, of atactic polypropylene, a preferred blend being comprised, by weight, of about 44 parts of bitumen B 100, above five parts of polyethylene and about one part of atactic polypropylene.

The above and other features of the present invention will be illustrated in more detail by the following specific examples.

EXAMPLE 1

Three thousand kilogram of bitumen pre-heated to a temperature of 200° C. were introduced into a mixing vessel having a capacity of about 4000 kg. While the vessel was filled with bitumen, 400 kg of mechanically comminuted polyethylene waste material and 80 kg of atactic polypropylene were introduced into the vessel cold. A stirring mechanism in the vessel was operated continuously to disperse the polyolefin material in the bitumen. A recycling conduit with its two ends connected to the lower half of the mixing vessel received the blended mass from the vessel at one end, and a screw pump in the conduit delivered the blended mass from the one end to the other end to return the mass to the vessel. A heat exchanger including a bundle of radiator tubes heated by hot oil was arranged along the recycling conduit.

As soon as the mixing vessel was about half filled, the pump was started to begin recycling of the blend and this recycling of the heated blend was continued beyond the approximately five minutes it took to fill the vessel until the blend in the recycling conduit had been heated by the heat exchanger to a temperature of 290° C. to 300° C. The blend was additionally heated by heating coils in the mixing vessel but the amount of heat supplied by the heating coils in the vessel was less than that delivered by the heat exchanger. After the bitumen-polyolefin mass has been worked by the screw pump in the recycling conduit for about 30 minutes, a homogenous state could be ascertained in the blend macroscopically. However, the working of the homogenous mass was continued while the temperature was maintained at about 300° C. and while the recycled mass was continuously stirred in the vessel, and the viscosity of the mass was observed continuously during this further working. At first, a slight increase in the viscosity was observed, which may be explained by the swelling solution of the polyolefin in the bitumen, whereupon a significant decrease in the viscosity was noted, which may be explained by the ensuing degradation of the polyolefin molecules. The homogenization was terminated 30 minutes after the homogenous state of the blend was ascertained macroscopically and about one hour after the terminal treatment of the mass had begun.

To adjust the polyolefin content in the bituminous binder to desired levels, additional bitumen, for example 500 kg, was added to the blend, if desired, and it was possible fully to homogenize this additional bitumen with the homogenous binder blend to obtain a binder of a lower polyolefin content.

EXAMPLE 2

In a modification of the method of Example 1, 3500 kg of bitumen B 100, 400 kg of comminuted polyethylene waste and 80 kg of atactic polypropylene were worked in the same manner until the homogenous state of the heated blend could be ascertained macroscopically, at which point an additional 500 kg of bitumen was introduced into the mixing vessel, which was rapidly incorporated into the homogenous mass and recycled therewith.

As soon as the blend was homogenous, test samples were taken every five minutes and their viscosity was ascertained with a viscosimeter having a capacity of one liter and discharge outlet of a diameter of 6.5 mm. Before the viscosity was measured, the temperature of the test sample was reduced to 190° C. In the first test measurement, the discharge time through the outlet was 280 seconds, followed by discharge times of 280 sec., 290 sec., 265 sec., 240 sec., 235 sec., and 225 sec., for successive test samples. After the seventh measurement, the operation was discontinued, the heated blend having been recycled about 7 to 8 times after its homogenous state had been ascertained.

In a comparative test with pure bitumen B 100, the discharge time of a test sample at a temperature of 190° C. was about 60 seconds.

The resultant bituminous binder was mixed with preheated gravel-sand material (AB08) in a conventional manner for producing an asphalt paving material containing about 6%, by weight, of the binder. Test samples were taken from this material and shaped into Marshal bodies whose characteristics, particularly the crushing strength, was determined. The values are given in Table 1, Table 2 giving the values obtained with a binder obtained in the same manner with a blend comprised, by weight, of 44 parts of bitumen B 100 and six parts of polyethylene waste. Comparative Table 3 shows the same values measured on test samples obtained from pure bitumen B 100, the mineral material being the same.

The Marshall test bodies of Table 1 were made at a temperature of 140° C. under the indicated number of impacts from the above construction material containing 6%, by weight, of the bituminous binder comprised of 44 parts bitumen B 100, five parts of polyethylene and one part of atactic polypropylene while the polyolefin component consisted of six parts of polyethylene in the test bodies of Table 2 and entirely omitted in those of Table 3. The test temperature was 25° C.

| Number of impacts | Density g/cm$^3$ | | Compression ratio | Porosity $H_{bit}$, % | Crushing Strength kp/cm$^2$ | | Compression $\Delta h$, mm |
|---|---|---|---|---|---|---|---|
| | $\rho a$ | $s_{\rho a}$ | | | $\sigma SZ$ | $s_{\sigma SZ}$ | |
| TABLE 1 | | | | | | | |
| 2 × 10 | 2.156 | 0.014 | 93.2 | 10.1 | 12.5 | 1.9 | 1.5 |
| 2 × 20 | 2.244 | 0.010 | 97.00 | 6.5 | 12.5 | 2.1 | 1.4 |
| 2 × 40 | 2.290 | 0.006 | 99.0 | 4.5 | 16.8 | 2.4 | 1.5 |
| 2 × 80 | 2.344 | 0.001 | 101.3 | 2.3 | 18.7 | 1.1 | 1.5 |
| 2 × 100 | 2.355 | 0.008 | 101.8 | 1.8 | 17.8 | 0.5 | 1.3 |
| TABLE 2 | | | | | | | |
| 2 × 10 | 2.111 | 0.006 | 91.7 | 12.0 | 11.5 | 2.6 | 1.8 |
| 2 × 20 | 2.182 | 0.011 | 94.7 | 9.0 | 12.1 | 0.1 | 1.6 |
| 2 × 40 | 2.288 | 0.028 | 98.7 | 4.6 | 15.4 | 1.9 | 1.6 |
| 2 × 80 | 2.347 | 0.009 | 101.9 | 2.2 | 16.8 | 2.0 | 1.6 |
| 2 × 100 | 2,362 | 0.001 | 102.6 | 1.5 | 19.5 | 0.2 | 1.6 |
| TABLE 3 | | | | | | | |
| 2 × 10 | 2.172 | 0.009 | 92.6 | 9.5 | 6.6 | 0.3 | 2.9 |
| 2 × 20 | 2.267 | 0.013 | 96.6 | 5.5 | 9.1 | 0.3 | 2.4 |
| 2 × 40 | 2.310 | 0.007 | 98.5 | 3.7 | 10.5 | 0.4 | 2.3 |
| 2 × 80 | 2.377 | 0.003 | 101.3 | 0.9 | 10.2 | 0.6 | 2.7 |
| 2 × 100 | 2.380 | 0.002 | 101.4 | 0.8 | 10.2 | 0.1 | 3.0 |

A charge of the binder produced according to Example 2 combined with the same type of mineral material and Marshall test bodies produced from this paving material showed the following values, the weight percentage of the bituminous binder in the material being 5.43%.

| | |
|---|---|
| Marshall stability value (kp) | 1350 |
| Marshall flow value (1/10 mm) | 37 |
| Porosity (vol. %) | 2.7 |

EXAMPLE 3

Referring to FIG. 1, 6.6 kg of bitumen B 100 having temperature of 200° C. was introduced in vessel 1 having a capacity of 10 liters, and 0.75 kg granulated polyethylene and 0.15 kg of atactic polypropylene were added to the bitumen, lowering the temperature to 140° C. Impact mixer 2 is built into vessel 1, this mixer being comprised of perforated tubular housing 5 stationarily mounted in the vessel and concentrically surrounding rotary perforated basket 4. A series of blades are circumferentially spaced about the periphery of perforated basket 4 and their axially extending edges 8 are spaced from the inner surface of stationary housing 5 by about 0.5 mm. An axially extending drive shaft affixed to basket 5 extends through the cover of the vessel and is connected to motor 3 capable of rotating the basket at 12,000 to 15,000 rpm.

After the bitumen, polyethylene and polypropylene were placed in vessel 1, motor 3 was operated to rotate the bladed basket in the stationary housing. The resultant centrifugal force in perforated basket 4 continuously pressed the bitumen-polyolefin mass thrugh perforations 6 of housing 5 while the impact of rotating blades 9 forcefully mixed the components of the blend passing outwardly through perforations 6 in the rotating basket and subjected the flowing stream of the blend in the very small space between rotating edges 8 of the blades and stationary housing 5 to a high shearing force causing colloidal comminution of the blend and intense homogenization resulting therefrom. The constant outward flow of the blend from basket 4 under centrifugal force causes the mass in the vessel to be moved into the basket, as indicated by arrows 7, thus keeping the heated blend continuously flowing.

Stationary housing 5 had a diameter of about 100 mm, the diameter of perforations 6 in the housing was 3 mm and there were about three perforations per square centimeter. Blades 9 had a radial width of 8 mm. At the indicated rotary speed of basket 4, the shear stress was 25 to 26 meters/second.

After about 12 minutes, the blend in the vessel had attained macroscopically observable homogeneity and, within 18 minutes, the temperature of the blend had reached 240° C. As shown in the drawing, vessel 1 is surrounded by heating coils 11 and, at the point of reaching homogeneity, the heating coils were energized to heat the blend in the vessel to a temperature of 280° C. This temperature was maintained more or less constantly for the remainder of the homogenization which was continued for a total of 30 minutes.

The power consumption of motor 3 was constantly measured as a means for monitoring the viscosity of the mass in vessel 1. At the beginning of the operation, the power consumption varied considerably. Practically at the same time as the mass reached macroscopic homogeneity after 12 minutes of blending, the power consumption of motor 3 became substantially stable. This was also the point when the polyolefin was practically dissolved in the bitumen. After 25 minutes, a reduction in the power consumption of motor 3 was observed, indicating a significant reduction in the viscosity of the blend in the vessel, and after 30 minutes, the motor power consumption was 35% less than that measured after 12 minutes of operation when the blend first became homogenous.

A paving material containing 6%, by weight, of this bituminous binder was then produced in the same manner as indicated in Examples 1 and 2, and this material was formed into Marshal test bodies, 2×50 impacts being used at a temperature of 140° C. The Marshall bodies had a density of 2.32 g/cm$^3$ and, at 25° C., had a crushing strength $\sigma$ SZ=20.7 kg/cm$^2$.

EXAMPLE 4

Instead of mixing the bituminous binder of Example 3 with the standard mineral material (AB08), a paving material was produced with a limestone-sand additive of lower quality, the particle size of this additive being about the same. The additive was pre-heated to a temperature of 200° C. before being mixed with the binder and the binder content of the paving material was again 6%. Marshall bodies were formed and tested under the same conditions as in Example 3, the crushing strength at 25° C. being 15.7 kg/cm$^2$ and at 40° C. being 6.8 kg/cm$^2$.

EXAMPLE 5

For the sake of comparison, the same mineral additive as used in Example 4 was mixed with 6% of bitumen B 100 as binder and Marshal bodies were formed from this paving material and the same conditions as in Examples 3 and 4, the crushing strength of these test bodies being 8.0 kg/cm$^2$ at 25° C. and 3.7 kg/cm$^2$ at 40° C.

EXAMPLE 6

Vessel 1 was filled with 3.6 kg of bitumen B 100 preheated to a temperature of 200° C. and the vessel was heated for five minutes while the impact mixer was operated and 3.0 kg of granulated polyethylene and 0.6 kg of atactic polypropylene were added. After this admixture was completed, the mass in the vessel had a temperature of 140° C. and homogenization was continued without further heating of the vessel. After a total of 25 minutes, homogeneity of the bitumen-polyolefin blend was macroscopically observed and the power consumption of motor 3 reached substantial stability. At this point, the temperature of the blend was 260° C.

Heating of the vessel was now resumed and within a period of five minutes, the blend had a temperature of 290° C. After a total operating time of about 40 minutes, the power consumption of the drive motor decreased significantly and, after a total time of 45 minutes, the power consumption was 25% lower than it had been after 25 minutes. At this point, homogenization was discontinued. Three-quarters of the blend were then removed from vessel 1 and 5.7 kg of bitumen B 100 pre-heated to 200° C. was added to the blend remaining in the vessel, the mass in the vessel then being heated to 290° C. At this temperature, homogenization was resumed for five minutes. The resultant binder was mixed with the standard mineral additive used in Examples 1 to 3 to obtain a paving material containing 6%, by weight, of the binder. Marshal bodies were again formed from the paving material in the same manner, these test bodies having a crushing strength of 20.5 kg/cm$^2$ at 25° C.

Figure 2:
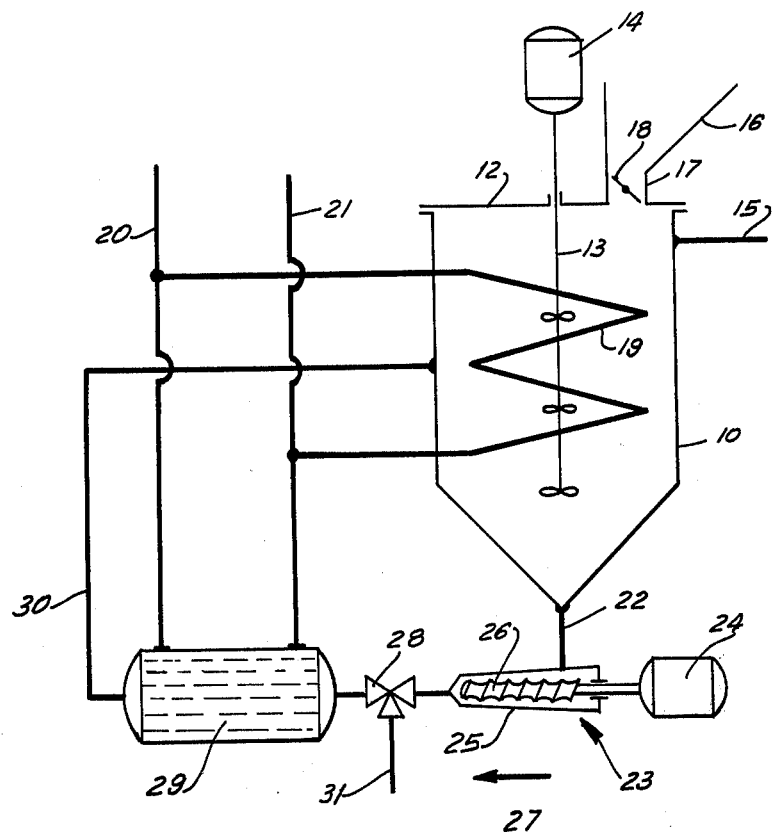
FIG. 2 is a diagrammatic view of one embodiment of the preferred apparatus of the invention.
Figure 3:
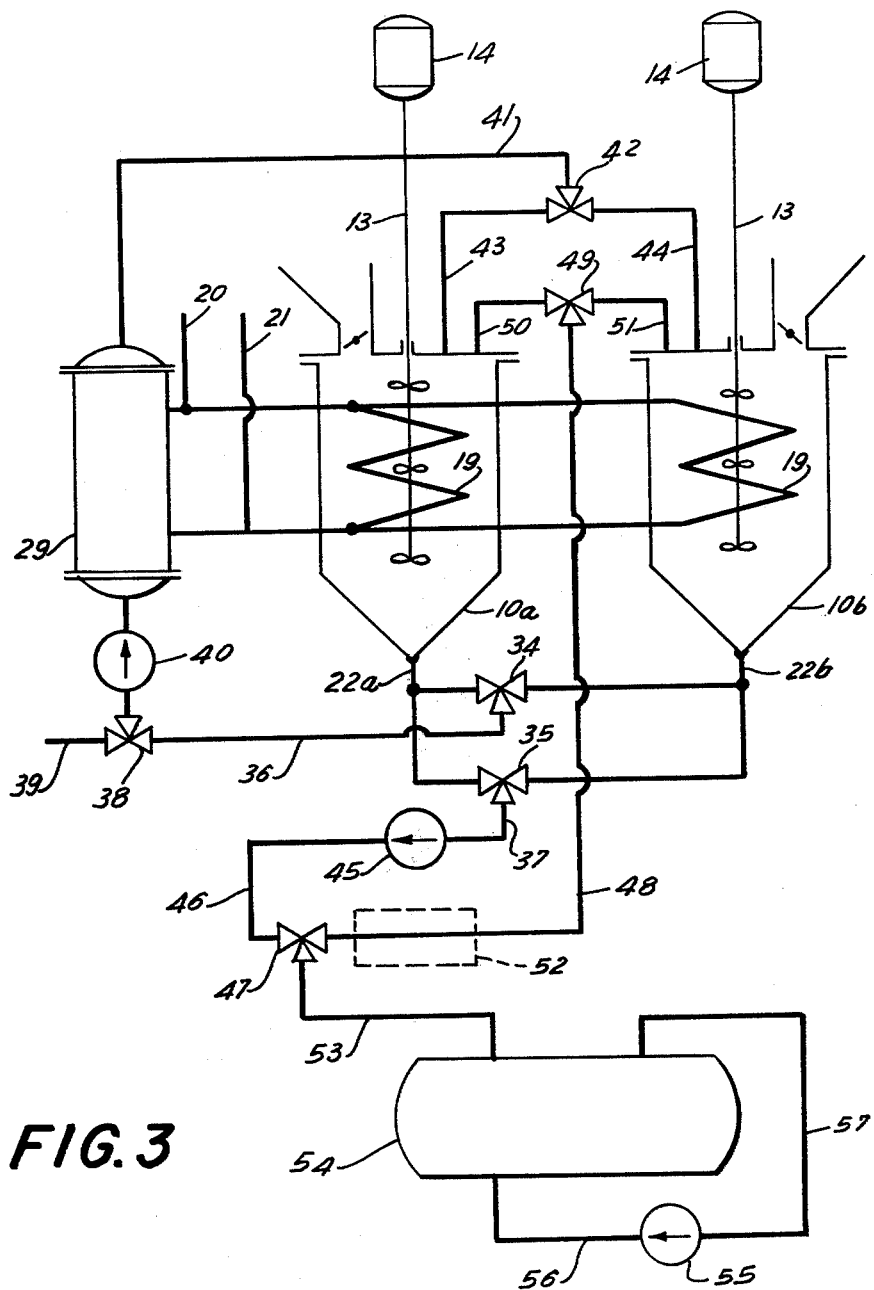
FIG. 3 is a like view of another embodiment.

The preferred apparatus of the present invention for carrying out the above-described method is illustrated by way of example in two embodiments respectively shown in FIGS. 2 and 3 which are merely diagrammatic and not drawn to scale for purposes of better illustration.

Referring first to the embodiment of FIG. 2, there is shown mixing vessel 10 closed by cover 12 which forms a substantially hermetic seal with the vessel along the upper edge thereof to permit the homogenization to proceed substantially in the absence of air. Means 13 for stirring a bitumen-polyolefin blend in the vessel comprises a conventional stirring mechanism rotated by drive motor 14 whereby the poleolefin is melted and dissolved in the bitumen in the vessel. Delivery conduit 15 is connected to the top of the vessel to permit liquid starting materials, such as hot bitumen and molten polyolefin, to be fed into vessel 10. Hopper 16 is mounted on cover 12 to permit solid comminuted materials, such as polyethylene waste, to be introduced into the vessel. Flap valve 18 is mounted in neck 17 of the hopper and may be operated from the outside to control the amount of material fed into the vessel through hopper 16 and also to close off the interior of the vessel from the ambient atmosphere. Furthermore, heating coil 19 is arranged in the vessel to permit the blend therein to be heated, one end of the heating coil being connected to delivery conduit 20 for superheated oil and its other end leading into discharge conduit 21 for the oil.

First recycling conduit portion 22 is connected to the lowest point of the hopper-shaped bottom of mixing vessel 20 and receives the blend from the vessel by gravity, this conduit portion discharging the blend into housing 25 of rotary pump 23, rotary screw 26 of the pump being surrounded by housing 25 and being driven by motor 24. The housing and the rotary screw define a very narrow passage therebetween which diminishes in the direction of flow indicated by arrow 27 of the blend removed from vessel 10 through end 22 of the recycling conduit. The rotary screw exerts a high shearing force on the blend flowing through the narrow and diminishing passage between the screw and the surrounding housing. Subsequent to pump 23, three-way valve 28 is mounted in the recycling conduit, followed by heat exchange 29 and second conduit portion 30 whose end is connected to vessel 10 to return the removed blend to the vessel.

Valve 28 is preferably a pneumatically operated global valve and the heat exchanger comprises a bundle of radiator tubes which receive superheated coil from delivery conduit 20 and from which the oil flows into discharge conduit 21. In this manner, the bitumen-polyolefin blend removed from vessel 10 is recycled through conduit 22, 23, 28, 29, 30 wherein it is subjected to forceful mixing under a high shearing force and heated.

An outlet conduit 31 is connected to one of the passages of three-way valve 28 to permit the finished blend to be discharged from the apparatus after the homogenization according to this invention has been completed.

While pump 23 has been illustrated as a rotary screw pump, this term, as used throughout the specification and claims, includes functionally equivalent pumps, such as gear pumps and the like, which force the blend through the recycling conduit while subjecting it to forceful mixing under a high shearing force. It is also possible to use a kneading device, particularly in combination with a pump. Preferably, an impact mixer, such as shown at 2 in FIG. 1, may be used in the recycling conduit instead of a pump.

The productivity of the homogenizing apparatus of FIG. 2, for a given size of the mixing vessel and recycling conduit, may be optimized by proper utilization of its most expensive parts, i.e. the shearing means and the heat exchanger.

Such an apparatus is illustrated in FIG. 3 wherein like reference numerals indicate like parts operating in a like manner to avoid redundancy in the description. In this embodiment, a pair of mixing vessels 10a and 10b are arranged in tandem, their heating coils 19 being connected to common oil delivery and discharge conduits 20 and 21. Three-way valves 34 and 35 are arranged in first recycling conduit portions 22a and 22b leading from vessels 10 and 10b, intermediate recycling conduit portions 36 and 37 leading from the valves to recycle the blends in two parallel recycling conduits to the mixing vessels. The first recycling conduit has three-way valve 38 connecting conduit portion 36 to means 40, for instance a pump or impact mixer, for subjecting the removed blend to forceful mixing under a high shearing force, followed by heat exchanger 29 and further conduit portion 41 leading to another three-way valve 42 which returns the blend through end conduit portion 43 or 44 into mixing vessel 10a or 10b, depending on the position of valve 42. An inlet conduit 39 is connected to one of the passages of intermediate three-way valve 38 to permit a liquid additive, for instance hot bitumen, to be admixed to the blend in the recycling conduit, if desired.

The second recycling conduit comprises conduit portion 37 leading to mixing means 45, which is the same or functionally equivalent to means 40, whence the forcefully mixed blend flows through further conduit portion 46 to three-way valve 47 and into additional conduit portion 48 leading to another three-way valve 49 which returns the blend through end conduit portions 50 or 51 into mixing vessels 10a or 10b, depending on the position of valve 49. As indicated in broken lines, it is preferred to place another heat exchanger 52 in conduit portion 48.

One of the passages of three-way valve 47 leads to discharge conduit 53 leading to storage tank 54 wherein the finished blend may be stored after the homogenization has been completed. The stored material may be recycled through the tank by a recycling conduit 56, 57 in which a pump 55 is arranged for moving the material through the conduit.

This embodiment is very efficient in its use of forceful high-shear mixing means 40 as well as the heat exchanger 29 which must be dimensioned so that they can handle the initially rather stiff blend coming from the mixing vessels. Less heat and mixing energy is required after the viscosity of the blend has been lowered so that mixing means 45 and heat exchanger 52 may be of smaller dimensions, and heat exchanger 52 may even be omitted since the heat capacity of the mass is relatively large and heating coils 19 in the vessels keep the temperature from falling too low. In the treatment cycle, recycling may be initiated in the first recycling conduit, wherein pump 40 and heat exchanger 29 are arranged, whereupon the flow of the blend is switched to the second recycling conduit wherein pump 45 is arranged, the first recycling conduit being used to initiate homogenization of the blend in the other vessel.

What is claimed is:

1. Method for preparing a bituminous binder for construction materials containing dispersed solid, predominantly inorganic additive substances, which comprises homogenizing a blend of bitumen and at least one polyolefin selected from the group consisting of polyethylene and polypropylene in a heated mixing vessel while stirring the blend and melting and dissolving the polyolefin in the bitumen, the blend being heated to a temperature between 260° C. and 310° C., forcing the blend through a narrow passage defined by a mixing element and having a width of less than 3 mm to subject the blend to forceful mixing under a high shearing force having a shearing stress of at least 20 meters/second, and continuing the homogenization until the polyolefin has been degraded and the viscosity of the homogenized blend has been reduced below a viscosity reduction attendant upon the mere heating of the blend at said temperature.

2. The method of claim 1, wherein the additive substances include gravel and sand, the construction material being an asphalt road paving material.

3. The method of claim 1 or 2, wherein the blend contains more than 10%, by weight, of the polyolefin, based on the weight of the bitumen.

4. The method of claim 1 or 2, wherein the temperature ranges from 280° C. to 300° C.

5. The method of claim 1, wherein the blend is forcefully mixed under the high shearing force in the heated mixing vessel.

6. The method of claim 1, comprising the further steps of continuously removing the stirred and heated blend from the vessel and recycling the removed blend to the vessel, the removed blend being forcefully mixed under a high shearing force outside the vessel and while being recycled.

7. The method of claim 6, comprising the further step of heating the removed blend while being recycled.

8. The method of claim 6, wherein the removed blend is recycled through a heat exchanger for heating the mixture.

9. The method of claim 6 or 7, wherein the removed blend is forcefully mixed by passing it through a pump defining the narrow passage for exerting the high shearing force on the mixture.

10. The method of claim 9, wherein the removed blend is passed through a screw pump.

11. The method of claim 10, wherein the passage is defined between a housing and a rotary screw surrounded by the housing and diminishes in the direction of flow of the removed blend through the screw pump, and pump including the housing and screw.

12. The method of claim 6 or 7, wherein the removed blend is forcefully mixed by kneading it under a high shearing force.

13. The method of claim 1, wherein the blend is forcefully mixed under a high shearing force by an impact mixer defining the narrow passage.

14. The method of claim 1, wherein the mixing element is a rotary element and the narrow passage has a width of less than 3 mm and extends between the rotary mixing element and a stationary element adjacent thereto.

15. The method of claim 14, wherein the width is less than 1 mm.

16. The method of claim 14, wherein the circumferential rotary speed of the rotary element relative to the stationary element along the edges of the rotary element is at least 20 meters/second.

17. The method of claim 1 or 2, wherein the narrow passage has a width of about 0.5 mm.

18. The method of claim 1, wherein the homogenization is effected in the substantial absence of air.

19. The method of claim 1, wherein the polypropylene is crystalline polypropylene.

20. The method of claim 1 or 19, wherein the blend contains atactic polypropylene.

21. The method of claim 20, wherein the blend contains 10% to 25%, by weight, of the atactic polypropylene, based on the weight of the polyolefin in the blend.

22. The method of claim 21, wherein the polyolefin component in the blend is comprised of about five parts, by weight, of polyethylene and about one part, by weight, of the atactic polypropylene.

23. The method of claim 22, wherein the blend is comprised, by weight, of about 44 parts of bitumen B 100, above five parts of polyethylene and about one part of atactic polypropylene.

24. The method of claim 1, wherein the homogenization of the blend is continued while the blend is subjected to the forceful mixing for 15 to 45 minutes at a temperature of about 300° C. after the blend has reached a macrosopically homogenous appearance.

25. The method of claim 24, comprising the further steps of continuously removing the stirred and heated blend from the vessel and recycling the removed blend to the vessel at least five times after the blend has reached the macroscopically homogenous appearance, the removed blend being forcefully mixed under the high shearing force outside the vessel and while being recycled.

* * * * *